United States Patent [19]
Anderson et al.

[11] 3,946,243
[45] Mar. 23, 1976

[54] REMOTE LOAD CONTROL

[75] Inventors: Clarence A. Anderson, Dearborn; Frank L. Taylor, Franklin, both of Mich.

[73] Assignee: The Detroit Edison Company, Detroit, Mich.

[22] Filed: Nov. 2, 1964

[21] Appl. No.: 408,301

[52] U.S. Cl............................. 307/140; 340/310 R
[51] Int. Cl.²......................................... H01M 11/04
[58] Field of Search............ 307/31, 32, 33, 34, 35, 307/38, 140, 1, 2, 3, 5, 6, 7; 340/310, 169, 355

[56] References Cited
UNITED STATES PATENTS

| | | | |
|---|---|---|---|
| 1,698,770 | 1/1929 | Ohl | 340/310 |
| 1,971,483 | 8/1934 | Espenschied | 340/310 |
| 2,348,525 | 5/1944 | Cravath | 340/310 UX |
| 2,647,253 | 7/1953 | Mackenzie et al. | 340/310 |
| 2,736,887 | 2/1956 | Hunsicker | 340/310 |
| 2,981,940 | 4/1961 | Garwin | 340/310 |
| 3,021,520 | 2/1962 | Weber | 340/310 X |
| 3,035,251 | 5/1962 | Inderwiesen | 340/310 X |

*Primary Examiner*—David Smith, Jr.
*Attorney, Agent, or Firm*—Whittemore, Hulbert & Belknap

[57] ABSTRACT

Apparatus for periodically withdrawing power from an alternating current power signal on a power distribution line at the source of the power signal, including an inductance across the power distribution line in series with a silicon controlled rectifier at a frequency which is a sub-multiple of the frequency which is a sub-multiple of the frequency of the power signal and synchronized therewith and means for detecting the periodic variation in the power of the power signal at a remote location and performing a control function, such as turning off a water heater for a predetermined time in accordance therewith and the method of performing the control function including withdrawing power from selected cycles of the power signal and remotely detecting the withdrawn power and performing the control function in accordance with the detection of the withdrawn power.

8 Claims, 6 Drawing Figures

INVENTOR.S
CLARENE A. ANDERSON
FRANK L. TAYLOR
BY
*Whittemore,*
*Hulbert & Belknap*
ATORNEYS

REMOTE LOAD CONTROL

The invention relates to generation and distribution of electric power and refers more specifically to a means for and method of generating an electric control signal at a predetermined point in an electric power distribution system and for receiving the signal at a location remote from a predetermined point to accomplish control at the remote location.

The demand for electric power from public utilities is normally cyclic. Thus there are normally peak periods during each day when the demand for electric power is much greater than at other times during the day. The peak periods may place an undesirable load on electric power generating and distribution systems which are normally operating at or near their peak. Even with electric power generating and distribution systems which have been designed to provide reserve capacity for future expansion the demand for power therefrom may be excessive during, for example severs storms and the like which cause the break-down of a portion of the power generating or distribution system, thus overloading the remaining portion of the system.

Electric power generation and distribution systems usually have a plurality of fixed loads thereon, such as hot water heaters, electric space heaters and the like which is turned off during the periods of peak demand on the power systems would present no particular discomfort or inconvenience but which would considerably reduce the electric power load on the generating and distribution system. In the past it has however been difficult to provide a system for automatically taking the desired electric load, such as water heaters at remote locations, off of the generating and distribution system during peak power demand periods from a central location in the system without expensive transmitting and receiving equipment or without adversely affecting the electric power transmitted to the remote locations.

It is therefore one of the purposes of the present invention to provide improved means for taking a portion of the electric load of a power generating and distribution system off of the system during peak system power demands.

Another object is to provide an improved method for taking a portion of the electric load of a power generating and distribution system off of the system during peak system power demands.

Another object is to provide means for placing a control signal on an electric power signal at a predetermined distribution point which control signal has a frequency lower than the frequency of the power signal, means for receiving the low frequency control signal at a location remote from the predetermined distribution point and a means responsive to the receiving means for removing a portion of the system electric load at the remote loation on reception of the control signal by the receiving means.

Another object is to provide a method for placing a low frequency control signal on an electric power signal at a predetermined point in a power distribution system, receiving the control signal at a remote location and taking electric power load off of the system at the remote location.

Another object is to provide an improved signal generator for placing a control signal on an electric power signal in a power generation and distribution system.

Another object is to provide an improved receiver for receiving a control signal on an electric power signal and means to accomplish control in a power generation and distribution system responsive to the receiver.

Another object is to provide an improved method of and means for placing an electric control signal on an electric power signal in a power generation and distribution system, for receiving the electric signal at a remote location and for accomplishing control at the remote location in accordance with the received control signal which is simple, economical and efficient.

Other objects and features of the invention will become apparent as the description proceeds, especially when taken in conjunction with the accompanying drawings, illustrating a preferred embodiment of the invention, wherein.

Figure 1:
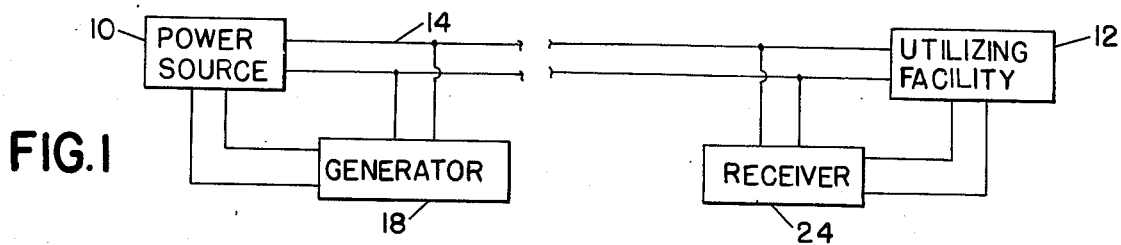
FIG. 1 is a block diagram of a portion of an electric power generation and distribution system including a control signal generator for generating a control signal in an electric power distribution system and a receiver for receiving the control signal at a remote location in accordance with the invention.

With particular reference to the figures of the drawing one embodiment of the present invention will now be considered in detail.

As illustrated in FIG. 1, the power source 10 supplies electric power which is distributed to the utilizing facility 12 at a remote location over the two conductor transmission line 14. The power source 10 may be the actual electric power generating station or may be a substation in an electric power distribution system. In the usual case the power source 10 will generate a 60 cycle alternating electric power signal on transmission line 14, as indicated by the alternating voltage signal 16 in FIG. 4.

Figure 4:
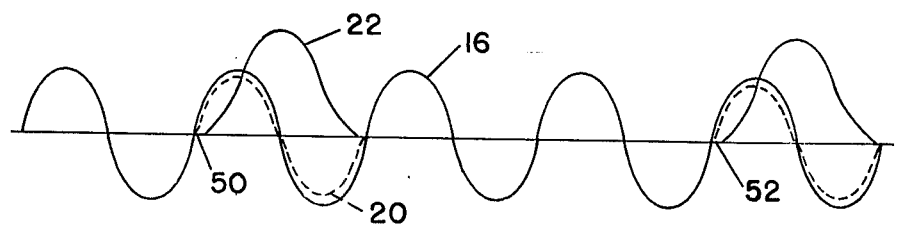
FIG. 4 shows the signal from the power source illustrated in FIG. 1 and the affect thereon of the signal generator illustrated in FIGS. 1 and 2.

The generator 18 is provided to vary the voltage of every third cycle of the power signal from the power source 10, as shown by the dotted line 20 in FIG. 4, due to the drawing of current indicated by the current signal 22 in FIG. 4 through the generator 18.

Figure 5:
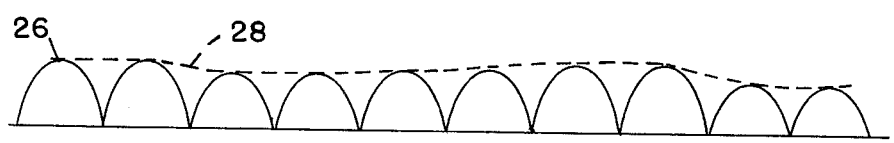
FIG. 5 illustrates the signal received at the receiver illustrated in FIGS. 1 and 3 after it has been rectified.
Figure 6:
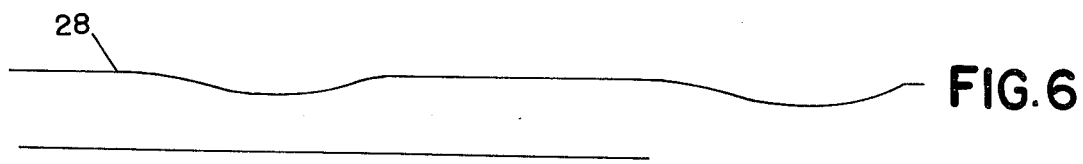
FIG. 6 illustrates the control signal provided at the remote location by the receiver illustrated in FIGS. 1 and 3.

After transmission of the altered voltage signal 16 of FIG. 4 to the utilizing facility 12 the receiver 24 is operable to provide full wave rectification of the voltage signal 16 to produce the voltage signal 26 illustrated in FIG. 5 which has a twenty cycle control signal 28 illustrated best in FIG. 6 and shown in dotted line in FIG. 5 thereon. The 20 cycle signal of FIG. 6 may be utilized to effect control, such as turning off water heater 56 at the utilizing facility 12.

Figure 2:
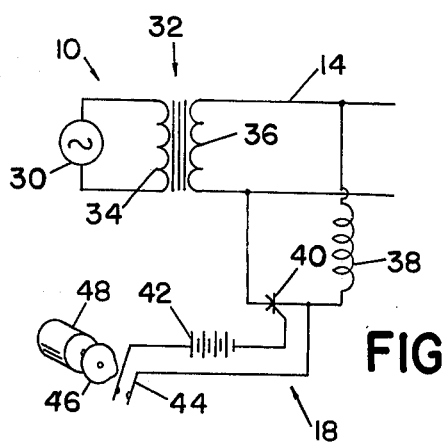
FIG. 2 is a schematic diagram of the signal generator illustrated in block diagram form in FIG. 1.

More specifically the power source 10 illustrated in FIG. 1 may be an alternating signal generator 30, as shown in FIG. 2, for generating a 60 cycle alternating electric power signal. The alternating electric signal from the generator 30 may then be coupled to the transmission line 14 by means of the power transformer 32 having the primary winding 34 connected across the signal generator 30 and the secondary winding 36 connected across the power transmission line 14. As mentioned above the signal output on the transmission line 14 will be a 60 cycle alternating electrical signal 16, as shown in FIG. 4. The invention may however be practiced with other frequencies, such as 50 cycles, and over a wide power range.

The signal generator 18, as illustrated best in FIG. 2, includes in the specific embodiment illustrated a choke coil 38 connected in series with a silicon controlled rectifier 40 across the conductors of transmission line 14. The gate circuit of the silicon controlled rectifier 40 is connected in series with the battery 42 which provides gating potential for the silicon controlled rectifier 40 to permit conduction therethrough on closing of the switch 44.

The switch 44 is intermittently closed by the cam 46 which is rotated by the motor 48. The motor 48 is a synchronous motor and in conjunction with the cam 46 operates to close the switch 44 once every three cycles of the 60 cycle signal 16 provided by the alternating signal generator 30.

Thus in operation, the cam 6 closes the switch 44 a very short time after the voltage on transmission line 14 starts to rise, as indicated at 50 and 52 in FIG. 4. At this time then the silicon controlled rectifier 40 receives a gating signal from the battery 42 whereby current is drawn from the transmission line 14 through the inductor 38 and silicon controlled rectifier 40. The drawing of the current continues for substantially a full cycle, as indicated by the current signal 22 in FIG. 4, so that the voltage of the signal 16 on transmission line 14 is reduced to the voltage indicated by the dotted line 20 every third cycle of the 60 cycle signal provided on transmission line 14. This reduced voltage signal every third cycle is transmitted undiminished for radial electric power distribution to the remote utilizing devices 12.

It will be understood that a capacitor could be used in place of the inductor 38 to periodically alter the voltage of the 60 cycle signal on the transmission line 14 as could a resistor. A resistor would provide voltage reduction of only one-half cycle rather than a full cycle and would consume more energy from the transmission line 14. Other problems exist when attempting to use a capacitor in place of the inductor 38.

The electric signal 16 transmitted on the transmission line 14 to the utilizing facility 12 is utilized by the load 54 which may include in parallel therewith load elements such as the hot water heater 56 connected directly across the conductors of transmission line 14 for energization therefrom which it is desirable to remove from the load at the utilizing facility for predetermined periods during peak demand periods on the power source 10.

Figure 3:
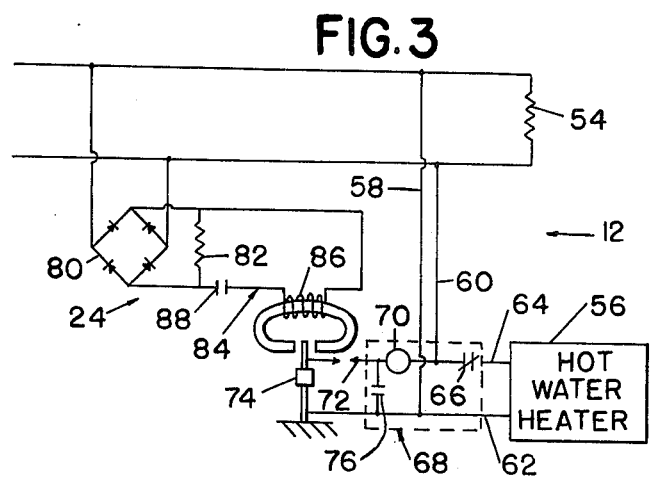
FIG. 3 is a schematic diagram of a receiver and a portionof the utilizing facility constructed in accordance with the invention and shown in block diagram form in FIG. 1.

As shown in FIG. 3 the heater 56 is connected to the transmission line 14 through the conductor 58 and conductor 62 connected to the conductor 58 and conductor 64 connected through the normally closed contacts 66 of the timing relay 68 to conductor 60. The timing relay solenoid 70 is connected in the conductor 60 while the switch 72 which is closed on vibration of the reed 74 is connected in the conductor 64. The normally open contacts 76 of the timing relay 68 are connected across the conductors 64 and 62, as shown in FIG. 3.

Thus, in operation, when the reed is not vibrated to close the switch 72, the heater 56 is energized from the transmission line 14 through conductors 58 and 62 and conductors 60 and 64 and the closed contacts 66 of the timing relay 68. On vibration of reed 74 and consequent closing of switch 72 the relay solenoid 70 is energized to close the normally open contacts 76 and open the normally closed contacts 66 to deenergize the heater 56. The relay 68 remains in this condition until it times out after a predetermined time, for example one-half hour, when it will return to the condition illustrated in FIG. 3 with the contacts 76 open and the contacts 66 closed to automatically place the heater 56 back across the transmission line 14 until the reed 74 is vibrated again.

The receiver 24 for receiving the 20 cycle signal passed down the transmission line 14 from the power source 10 and vibrating the reed 74 on reception thereof includes the full wave rectifier 80, damping resistor 82 and the series resonant circuit 84 including the coil 86 and capacitor 88. The inductance and capacitance of the cooil 86 and capacitor 88 is chosen in conjunction with the other circuit parameters, such as the value of resistance 82 to be series resonant at the frequency of the control signal placed on the transmission line 14, that is to say at 20 cycles per second so that a maximum current will pass through coil 86 only on reception of a 20 cycle signal to produce vibration of reed 74 and closing of switch 72 on reception of the 20 cycle signal.

Thus the 60 cycle voltage 16 which is illustrated by the dotted line 20 in FIG. 4 as having every third cycle reduced in voltage is rectified to produce the signal volage 26 illustrated in FIG. 5 in rectifier 80. The 20 cycle signal 28 illustrated in FIG. 6 is derived from the rectified 60 cycle signal 16 on the transmission line 14 due to the filtering effect of the resistor 82, inductor 86 and capacitor 88 and is shown with relation to the rectified electric signal 26 in FIG. 5.

Thus in over-all operation the power source 10 is assumed to be transmitting electric power at 60 cycles per second over transmission line 14 to the utilizing facility 12 including for example the heater 56 which it is desired to take off of the distribution system at the utilizing facility during peak power demands on the power source 10. Timing relay 68 is not energized so that the contacts 76 are open and the contacts 66 are closed with the heater 56 in the load on the distribution system.

At peak demand when it is desired to remove the heater 56 from the load on the distribution system the synchronous motor 48 is energized to close the switch 44 once every third cycle of the 60 cycle transmission line voltage signal 16 at a point in the cycle immediately after the voltage signal 16 starts to go positive, as at 50 and 52 in FIG. 4. The silicon controlled rectifier 40 receives a gate pulse each time the switch 44 is closed from battery 42. On receipt of a gate pulse by the silicon controlled rectifier 40 it will conduct current through the inductor 38 for slightly less than a full cycle of the voltage 16 after which the silicon controlled rectifier will be cut off due to the operating parameters thereof. The drawing of the current through the inductor 38 reduces the voltage of every third cycle of the 60 cycle signal on transmission line 14, as shown by the dotted voltage line 20 in FIG. 4.

The modified 60 cycle signal on arrival at the utilizing facility is rectified through the rectifier 80 to provide the voltage 26 illustrated in FIG. 5 having the 20 cycle component 28 impressed thereon. The 20 cycle signal 28 is sensed by the series resonant circuit 84 to cause the reed 74 to vibrate and close the switch 72.

As indicated above closing of the switch 72 will energize the relay coil 70 of timing relay 68 to open contacts 66, taking the heater 56 off of the distributing system at the utilizing facility and holding the relay coil 70 energized for a predetermined time. At the end of the predetermined time if there are no 20 cycle signals on the transmission line 14 the relay 68 will automatically time out and will be deenergized with the contacts 76 and 66 returning to the condition illustrated in FIG. 3 at which time the heater 56 will be placed back across the transmission line 14.

While one embodiment of the present invention has been disclosed in detail and modifications thereof indicated, it will be understood that other embodiments and modifications of the invention are contemplated. For example, the signal generated by signal generator 18 may be used to affect other control in a distribution system for electric power than removing a hot water heater load therefrom. Also, an ignitron for example could be used in place of the silicon controlled rectifier in the signal generator and the generator could be provided in a three-phase arrangement wherein the one synchronous motor drives three cams to trip three single phase generators so that their individual signals will bolster each other. It is the intention to include all modifications and embodiments as are defined by the appended claims within the scope of the invention.

What we claim as our invention is:

1. A source of an alternating electric power signal including an alternating electric power signal generator, a transformer having a primary winding connected to receive the alternating electric power signal output of the alternating electric power generator and a secondary winding, a transmission line for alternating electric power, the secondary winding of the transformer being connected to the transmission line for transmitting alternating electrical energy from the generator over the transmission line, means for periodically placing a load across the transmission line at a frequency which is a sub-multiple of the frequency of the alternating electric signal and synchronized with the alternating electric signal for withdrawing power only from separated individual selected cycles of the alternating electric energy including a silicon controlled rectifier having a control electrode and an induction coil connected in series across the transmission line, a source of direct current electrical energy and a switch connected in series between the control electrode of the silicon controlled rectifier and the silicon controlled rectifier and induction coil, and motor driven cam means synchronized with the alternating electric signal and positioned next to the switch for closing the switch only during the selected cycles of the alternating electric power signal at a sub-multiple frequency of the power signal, a utilizing facility for the alternating electric power signal connected to the distribution line and means for detecting the periodic withdrawal of power from the alternating electric power signal at the utilizing facility and providing a control signal for the utilizing facility in accordance therewith including a rectifier connected across the distribution line, a resonant circuit connected to the rectifier resonate at the sub-multiple frequency of the withdrawal of power from the alternating electric power signal, and switch means responsive to the resonant circuit for effecting a control function on resonance of the resonant circuit.

2. Structure as set forth in claim 1 wherein the alternating electric power signal is a 60 hertz signal and the sub-multiple frequency is 20 hertz whereby one in every three cycles of the alternating electric power signal is reduced in power to provide a control signal with a minimum of power loss and distortion of the alternating electric power signal.

3. Structure as set forth in claim 2 wherein the means for periodically causing the silicon controlled rectifier to conduct comprises a source of electrical energy and a switch connected in series with the control electrode of the silicon controlled rectifier, cam means for periodically closing the switch on rotation thereof and a synchronous motor driven in accordance with the frequency of the electric power signal connected to the cam means for rotating the cam means.

4. A source of alternating electric power signal, a utilizing facility for the alternating electric power signal, means for distributing the electric power signal from the signal source including a power distribution line, means for periodically withdrawing current only from selected cycles of the alternating electric power signal at a sub-multiple frequency of the power signal and synchronized therewith including an inductance positioned across the distribution line adjacent the signal source in series with a silicon controlled rectifier, means synchronized with the frequency of the power signal for periodically causing the silicon controlled rectifier to conduct, and means for detecting the periodic withdrawal of power from the power signal at the utilizing facility and providing a control signal in accordance therewith.

5. Structure as set forth in claim 4, wherein the means for periodically causing the silicon controlled rectifier to conduct comprises a source of electrical energy and a switch connected in series with the control electrode of the silicon controlled rectifier, cam means for periodically closing the switch on rotation thereof and a synchronous motor driven in accordance with the frequency of the electric power signal connected to the cam means for rotating the cam means.

6. A source of alternating electric power signal, a utilizing facility for the alternating electric power signal, means for distributing the electric power signal from the signal source to the utilizing facility including a power distribution line, means for periodically withdrawing power only from selected cycles of the alternating electric power signal at a sub-multiple frequency of the power signal and synchronized therewith including an inductance positioned across the distribution line adjacent the signal source in series with a silicon controlled rectifier and means synchronized with the frequency of the power signal for periodically causing the silicon controlled rectifier to conduct and means for detecting the periodic withdrawal of power from the power signal at the utilizing facility and providing a control signal in accordance therewith comprising a rectifier connected across the distribution line, a resonant circuit connected to the rectifier resonate at the frequency of the withdrawal of current from the power signal, and switch means responsive to the resonant circuit for effecting a control function on resonance of the resonant circuit.

7. Structure as set forth in claim 6, wherein the means for periodically causing the silicon controlled rectifier to conduct comprises a source of electrical energy and a switch connected in series with the control electrode of the silicon controlled rectifier, a cam rotatable to periodically close the switch and a synchronous motor driven by the alternating electric power signal connected to rotate the cam.

8. A source of alternating electric power signal including a transformer having a secondary winding and means operably associated with the power signal source for periodically withdrawing current only from selected cycles of the alternating power signal at a sub-multiple of the frequency of the power signal and synchronized with the power signal to provide a control function for the alternating electric power signal, including an inductance and a silicon controlled rectifier connected in series across the transformer secondary winding and means for periodically causing the silicon controlled rectifier to conduct.

* * * * *